United States Patent
Okamoto et al.

(10) Patent No.: US 6,820,557 B2
(45) Date of Patent: Nov. 23, 2004

(54) IGNITER FOR AIR BAG SYSTEM

(75) Inventors: Mitsuyasu Okamoto, Himeji (JP); Shingo Oda, Himeji (JP)

(73) Assignee: Daicel Chemical Industries, Ltd., Tokyo (JP)

(*) Notice: Subject to any disclaimer, the term of this patent is extended or adjusted under 35 U.S.C. 154(b) by 0 days.

(21) Appl. No.: 10/350,097

(22) Filed: Jan. 24, 2003

(65) Prior Publication Data

US 2004/0103811 A1 Jun. 3, 2004

Related U.S. Application Data

(60) Provisional application No. 60/360,020, filed on Feb. 28, 2002.

(30) Foreign Application Priority Data

Jan. 25, 2002 (JP) ..................................... 2002-016326
Feb. 15, 2002 (JP) ..................................... 2002-038681

(51) Int. Cl.[7] ............................................. F23Q 21/00
(52) U.S. Cl. ..................... 102/218; 102/206; 280/735
(58) Field of Search ............................... 102/206, 218, 102/219, 530; 280/728.1, 734, 735

(56) References Cited

U.S. PATENT DOCUMENTS

| 4,819,560 A | 4/1989 | Patz et al. |
| 6,418,853 B1 | 7/2002 | Duguet et al. |

FOREIGN PATENT DOCUMENTS

| JP | 2707250 B2 | 10/1997 |
| JP | 2000-241098 A | 9/2000 |
| JP | 2000-513799 A | 10/2000 |
| JP | 2001-171475 A | 6/2001 |
| WO | WO 98/36949 A1 | 8/1998 |
| WO | WO 00/43727 A1 | 7/2000 |

OTHER PUBLICATIONS

Munger, A.C., "Electrothermal Response Testing, A Component Development Tool," Seventh International Pyrotechnics Seminar, Jul. 1980, pp. 461–478, vol. 1, IIT Research Institute, Vail, Colorado.

Primary Examiner—Charles T. Jordan
Assistant Examiner—T. Nguyen
(74) Attorney, Agent, or Firm—Birch, Stewart, Kolasch & Birch, LLP

(57) ABSTRACT

The present invention provides an igniter for an air bag system in which the whole weight can be reduced.

The present invention provides an igniter for an air bag system which is used in an air bag system comprising an ECU connected to a power source and an impact detecting sensor, and a module case accommodating a gas generator and an air bag and that is incorporated in the gas generator, wherein the system is constituted such that a bus line comprising plural loop wires passing through the ECU to supply currents and the like, and individual gas generators which are connected operationally by plural conductors branched from the bus line, the igniter is an electric igniter provided with a heat generating portion and a priming contacting the heat generating portion, the igniter and the bus line are connected to each other by the conductor, a capacitor and an IC are provided, and a current for igniting the priming is supplied through the capacitor.

33 Claims, 14 Drawing Sheets

IGNITER FOR AIR BAG SYSTEM

This application claims the benefit of Provisional Application Ser. No. 60/360,020 filed Feb. 28, 2002.

TECHNICAL FIELD TO WHICH THE INVENTION BELONGS

The present invention relates to an igniter for an air bag system used in an air bag system using a bus system and a method for controlling operation of an air bag system using the same.

Prior Art

An air bag system for protecting a passenger from an impact at a time of collision of a vehicle is indispensable, and the air bag system needs to be reduced in weight from a demand for reducing weight of a whole vehicle. Recently, kinds and the total number of air bags such as an air bag for a driver side, an air bag for a passenger side next to the driver, an air bag for a rear seat side, and an air bag for an side impact are increasing, and therefore, a lighter air bag system is in greater demand.

In a current air bag system, an electronic control unit (ECU) connected to a power source (a battery in a vehicle) and an impact detecting sensor are individually connected to individual gas generators (a gas generator and an air bag are accommodated in a module case). An aspect of the connection between the ECU and the individual gas generators is shown in FIG. 13.

As shown in FIG. 13, the ECU and an igniter (FIG. 14) of each of the individual gas generators are necessarily connected to each other through two conductors, and thereby, conductors double the number of the total number of igniters are required. Having many conductors contributes largely to weight increase in an air bag system. In view of constraints at a time of assembling vehicle parts, the ECU and the individual gas generators are not connected by only the conductors but connected by connecting plural conductors via plural connectors, and thereby, there occurs a serious problem such as a weight increase due to use of the connectors and a cost increase due to increase of the number of the connectors. Further, increase in volume (weight) of the ECU due to increase in volume of a capacitor incorporated into the ECU as a backup power source for activating all the igniters (serving at a time of a disconnection between the power source and the ECU) is another serious problem.

In view of the above, a trial for reducing a conductor weight required for connection between the ECU and the individual gas generators by utilizing a bus system in the air bag system has been examined. An aspect of the air bag system utilizing this bus system is shown in FIG. 1.

As shown in FIG. 1, an air bag system is constituted by providing bus lines comprising plural loop wires passing through the ECU and connecting each of the individual gas generators to the bus line through two conductors (three or more conductors when occasion demands). In a case of such an air bag system as shown in FIG. 1, since only gas generators required corresponding to a collision situation of a vehicle are activated, an integrated circuit receiving information transmission from the ECU and a capacitor supplying a current for activating an igniter are provided in each of the individual gas generators. In the case of utilizing a bus system, the total number of capacitors is increased, but since the capacitors are distributed and arranged in the ECU and the respective igniters, the capacitance and weight of the capacitor per igniter is reduced. As a result, since the weight of the capacitors in this case is remarkably reduced as compared with the weight of the capacitors for backup in the air bag system shown in FIG. 13, a large weight reduction is achieved as the whole system in addition to largely reducing the amount of use of conductor, which is expected to be put in a practical use in the air bag system. Incidentally, there have been known JP2000-241098A, JP2000-513799A and Japanese Patent No. 2707250 as the prior art utilizing the bus system.

DISCLOSURE OF THE INVENTION

An object of the present invention is to provide an igniter for an air bag system which achieves a large weight reduction in an entire air bag system by introducing a bus system into the air bag system, and which can ensure reliability and rapidness of operation similar to those in a conventional art, and which can obtain a high reliability, and an operation control method of an air bag system utilizing the same.

(1) First Solving Means

An invention described in claim 1 provides, as one means for solving the above problem, an igniter, for an air bag system, which is one or at least two igniters incorporated in the plural of the gas generators and used in an air bag system comprising an electronic control unit connected to a power source and an impact detecting sensor, and plural module cases which are connected to the electronic control unit and accommodate plural gas generators and plural air bags, wherein, in the air bag system, a bus line comprising plural loop wires which pass through the electronic control unit is provided to supply and transmit currents and required information, and individual gas generators accommodated in the plural module cases are connected operationally by plural conductors branched at predetermined portions from the bus line, the one or at least two igniters incorporated in the gas generator is an electric igniter which is provided with a heat generating portion and a priming coming in contact with the heat generating portion, and the igniter and the bus line are connected to each other through plural conductors, and the capacitor and the integrated circuit recorded with information to exhibit required functions are provided in the igniter, and a current for igniting the priming is supplied to the one or at least two igniters through a capacitor inside the igniter.

The numbers of the loop wires forming the bus line and the conductors for connecting the bus line and the gas generators may be two, three, or four or more, respectively, but, in view of simplification of the entire system, two is preferable.

The priming is not limited to a specific one, but a combination of a metal or the like and an oxidizing agent such as perchlorate is preferable, a combination of a metal such as zirconium, titanium, and hafnium and perchlorate is more preferable, and a mixture (ZPP) of zirconium and potassium perchlorate is particularly preferable. Desirably, the ZPP is formed in particle shape and particle diameters of zirconium and potassium perchlorate are adjusted.

A capacitance of the capacitor is preferably not more than 24 $\mu$F, more preferably not more than 12 $\mu$F, further more preferably not more than 6 $\mu$F.

Preferably, the air bag system using an igniter for an air bag system of the present invention is activated such that a current for igniting the priming in one or at least two igniters is supplied via the capacitor inside the igniter, and that a time period for supplying a current from the capacitor to the heat generating portion is the period from the point where a current value reaches the current value corresponding to 5% of the maximum current value to the point where it is reduced down to the current value corresponding to 5% of the maximum current value, which is within 500 μsec. In this case, the maximum current value in the period for supplying a current is a current value sufficient to ignite the priming. The period for supplying a current is preferably within 200 μsec, and more preferably within 100 μsec. Incidentally, a current value at this time varies depending on a resistance value of the heat generating portion in the igniter, and it is determined on the basis of presence or absence of the waveform converting circuit, the constitution of the waveform converting circuit, a particle diameter of a priming, a shape of the heat generating portion and the like.

In the case of a conventional air bag system, since a current for activating an igniter flows from a power source (a battery) with a relatively large capacitance at 1.2 A for about 2 msec, that is, at a relatively low current for a relatively long time, a waveform of an ignition current (a vertical axis denotes a current value (A) and a horizontal axis denotes a time (μ sec)) becomes rectangular.

In the present invention, however, since an electric current for activating an igniter is supplied from a capacitor with a relatively small capacitance, it is preferable that a relatively high electric current flows for a short time, because ignition of the igniter is made smoother and ignition energy itself can be made smaller. The waveform of the ignition current at this time (a vertical axis denotes a current value (A) and a horizontal axis denotes a time (μsec)) becomes a discharging waveform expressed by the following formula (I) when discharging starts at a time of time t=0:

$$i(t)=(V0/R) \times e^{-t/CR} \qquad (I)$$

(In the formula, v0 represents a capacitor charging voltage (V), R represents a circuit resistance (Ω), C represents a capacitor capacitance (μF), t represents a time (μsec), and i represents a current (A)).

When such a discharging waveform expressed by the formula (I) is employed, a current value becomes larger than a conventional rectangular waveform, but a current conduction time is shortened. Therefore, the ignition energy itself is reduced largely.

In the present invention, when a period in which a stable current supplying is being maintained after reaching a desired current value is defined as t (μsec) and a period from a start of waveform rising to stopping of current supplying for making the heat generating portion generate a heat is defined as T (μsec), it is preferable that a relationship (t/T) between these t and T is in the range of $0 \leq t/T < 0.2$ or $0.5 < t/T < 1$.

In the case of $0 < t/T < 0.2$, a waveform of a current is similar to a discharging waveform (a waveform similar to a triangle) obtained when electricity stored in the capacitor is applied to the heat generating portion directly. In case of $0.5 < t/T < 1$, a waveform of a current is similar to a waveform (a waveform similar to a triangle) obtained when a discharging waveform is converted through a discharging waveform converting circuit for converting a waveform of a current stored in a capacitor to a signal waveform of a current for igniting the priming or the like.

The above inventions is preferably provided with a capacitor and the integrated circuit having required functions, and further preferably, it is provided with a discharging waveform converting circuit. The discharging waveform converting circuit is one having a function for converting the discharging waveform expressed by the following formula (I) to a triangular waveform or a trapezoidal waveform. In addition, in order to provide a similar converting function, a coil can be interposed in a connecting circuit between the capacitor and the heat generating portion, and the discharging waveform converting circuit can further be provided in the integrated circuit in view of simplification of the entire system.

(2) Second and Third Solving Means

An invention described in claims 6 and 7 provides, as one means for solving the above problem, an igniter for an air bag system, which is one or at least two igniters incorporated in the plural of the gas generators and used in an air bag system comprising an electronic control unit connected to a power source and an impact detecting sensor, and plural module cases which are connected to the electronic control unit and accommodate plural gas generators and plural air bags, wherein, in the air bag system, a bus line comprising plural loop wires which pass through the electronic control unit is provided to supply and transmit currents and required information, and individual gas generators accommodated in the plural module cases are connected operationally by plural conductors branched at predetermined portions from the bus line, the one or at least two igniters incorporated in the gas generator is each electric igniter which is provided with a heat generating portion and a priming coming in contact with the heat generating portion, and the igniter and the bus line are connected to each other through plural conductors, a capacitor, an integrated circuit in which information for developing a required function is stored, and the heat generating portion is provided on one substrate in each igniter, and the substrate is provided vertically, and at least the capacitor and the integrated circuit on the substrate, and the priming are not in contact with one another, and a current for igniting a priming is supplied to the igniter through the capacitor in the igniter.

Further, the present invention provides, as one means for solving the above problem, an igniter for an air bag system, which is one or at least two igniters incorporated in the plural of the gas generators and used in an air bag system comprising an electronic control unit connected to a power source and an impact detecting sensor, and plural module cases which are connected to the electronic control unit and accommodate plural gas generators and plural air bags, wherein, in the air bag system, a bus line comprising plural loop wires which pass through the electronic control unit is provided to supply and transmit currents and required information, and individual gas generators accommodated in the plural module cases are connected operationally by plural conductors branched at predetermined portions from the bus line, the one or at least two igniters incorporated in the gas generator is each electric igniter which is provided with a heat generating portion and a priming coming in contact with the heat generating portion, and the igniter and the bus line are connected to each other through plural conductors, each igniter has a capacitor and an integrated circuit in which information to exhibit a required function which are provided on the one substrate, and the substrate is provided vertically, a header, which supports an electroconductive member for supplying and transmitting a current between the substrate and the heat generating portion, sections vertically between the substrate and the priming, and the substrate is arranged below the header and the heat generating portion is arranged above the header, and a current for igniting the priming is supplied to one or at least two igniters through the capacitor in the igniter. In this case, as long as the heat generating portion is provided above the header, it may be provided on a header surface or it may be provided over the header, separated from the header surface.

In the above respective inventions, the numbers of the loop wires forming the bus line and the conductors for connecting the bus line and the gas generators may be two, three, or four or more, respectively, and two is preferable in view of simplifying the entire system.

In the above respective inventions, the priming is not limited to a specific one, but a combination of a metal or the like and an oxidizing agent such as perchlorate is preferable, a combination of a metal such as zirconium, titanium, and hafnium and perchlorate is more preferable, and a mixture (ZPP) of zirconium and potassium perchlorate is particularly preferable. Desirably, the ZPP is formed in particle shape and particle diameters of zirconium and potassium perchlorate are adjusted.

In the above respective inventions, a capacitance of the capacitor is preferably not more than 24 $\mu$F, more preferably not more than 12 $\mu$F, and further preferably not more than 6 $\mu$.

In the above invention, the respective igniters of the respective gas generators are provided with a capacitor and an integrated circuit having a required function, and preferably, a discharging waveform converting circuit is further provided.

In the above invention, the integrated circuit (and the discharging waveform converting circuit, if required) is provided on one surface of the substrate and the capacitor (and the discharging waveform converting circuit, if required) is provided on the other surface. The heat generating portion may be provided on either surface, but desirably, it is provided on the same surface as the integrated circuit to facilitate circuit formation (a soldering work). Further, if the waveform converting circuit is provided, preferably, it is provided in the integrated circuit in view of simplifying the entire system.

In the above invention, such a structure can be employed that the substrate is fitted to penetrate a header for forming a priming holding space together with a cup member for holding the priming, and the capacitor and the integrated circuit are positioned below the header, and the heat generating portion projects above the header to come into contact with the priming.

When the heat generating portion is provided on the header, the following methods or the like can be employed: a method for welding a wire for heat generation on the header to fix the heat generating portion; a method for, after pasting a metal foil on an insulating substrate comprising an aluminum with oxidized coating, a glass, epoxy resin, phenol resin, polyimide or the like, forming the heat generating portion by etching; a method for forming the heat generating portion by performing vapor deposition of an electroconductive material on a pattern-masked insulating substrate; a method for printing electrical electroconductive material on an insulating substrate.

By providing the integrated circuit and the capacitor on different surfaces of the substrate in this manner, a compact structure can be achieved as compared with a case of providing on one surface. Further, by providing the priming above the header and providing the substrate below the header, the integrated circuit or the capacitor does not come in contact with the priming, so that pollution of the capacitor or the integrated circuit due to the priming can be prevented and, in addition thereto, a possibility of erroneous activation of the igniter can also be eliminated.

In the above invention, such a structure can be employed that the integrated circuit and the capacitor (and the discharging waveform converting circuit, if required) are provided on one surface of the substrate. The heat generating portion may be provided on either surface, but desirably, it is on the same surface as the integrated circuit and the capacitor. The discharging waveform converting circuit functions to convert the discharging waveform expressed by the formula (I) into a triangular waveform or a trapezoidal waveform.

In the above invention, such a structure can be employed that a portion of the substrate except for the heat generating portion is sealed with thermoplastic resin containing glass fibers, thermosetting resin such as epoxy resin, organic and inorganic insulating material such as glass, and the heat generating portion is in contact with the priming. When a substrate having such a structure is used, the substrate exists above the header for supporting pins which serve as interposing members to supply and transmit a current and required information to the integrated circuit and the capacitor.

In case of employing such a structure, the capacitor and the integrated circuit are protected and the capacitor and the integrated circuit do not come in contact with the priming, and thereby, pollution of the capacitor and the integrated circuit due to the priming can be prevented.

In the above invention, an electroconductive pattern is formed on a substrate by etching, including connecting portions which connect the integrated circuit with the heat generating portion, the capacitor and the bus line, and the heat generating portion of the igniter. At this time, the conductor pattern forming the connecting portions which connect the integrated circuit with the heat generating portion, the capacitor and the bus line can be two routes for each connecting portion, i.e., the total six routes as shown in FIG. 8 and FIG. 9. Incidentally, as the etching, wet etching, dry etching (plasma etching, sputter etching, reactive ion etching) photo etching or the like can be applied.

When such conductor patterns are used, the number of connecting portions obtained by soldering is reduced as compared with a case of connecting all of the integrated circuit, the heat generating portion and the capacitor with a conductor and soldering the connecting portions. As a result, a possibility of a malfunction in activation due to a resistance value and a loose connection is decreased, which is preferable. Furthermore, by providing such conductor patterns, a wiring is facilitated, and manufacturing is made easier as compared with a case of providing a bridge wire as the heat generating portion.

In the above first to third solving means, as the integrated circuit recorded with information to exhibit required functions, the one recorded with information for exhibiting one or at least two functions selected from the group of (i)a function for detecting abnormality of the heat generating portion of the igniter in the gas generator, (ii)a function for identifying each of the plural gas generators and (iii)a function for detecting a malfunction of the capacitor can be used. And additionally, it is preferable that (iv)a circuit for preventing the igniter from being activated erroneously due to a noise generated outside the igniter is provided in the igniter.

Usually the integrated circuit is provided with a basic function to activate a proper gas generator for protecting the passenger according to a situation of a vehicle collision upon receiving a signal from the ECU. In addition thereto, by providing the above various functions, quality check of a product at a time of shipping, workability at a time of assembling and safety at an actual use (while driving a vehicle) and the like can be improved properly.

(i) The Function for Detecting Abnormality of the Heat Generating Portion of the Igniter in the Gas Generator:

As one of conditions required for the gas generator to activate normally, a contacting state between the heat generating portion of the igniter and the priming has to be good (the heat generating portion and the priming has to be brought in press-contact with each other). For example, when there is a gap between the heat generating portion and the priming, it is considered that there occurs a malfunction such that the priming is not ignited when the igniter is actuated or an ignition is delayed. Further, when the heat generating portion is disconnected or have been half-disconnected, a similar malfunction occurs. For this reason, by recording information for detecting the malfunction in the integrated circuit, an inferior product can be removed at a time of shipping, and by detecting abnormality at a practical use (while driving a vehicle), a prompt exchange can be performed.

Detecting theory for abnormality of the heat generating portion (Thermal Transient Test; issued on pages 461 to 478 in "Progress of International Pyrotechnic Semina " on July 1980 by A. C. Munger) is as follows: when contacting state of a heat generating portion and a priming is good, most part of calorie generated by flowing of a constant current is conducted to the priming, so that the temperature of the heat generating portion does not rise so high. On the other hand, when the contacting state of the heat generating portion and the priming is bad, transfer of heat is less, so that the temperature rising of the heat generating portion becomes higher than a normal case. Therefore, a malfunction is detected by detecting a temperature change due to such a difference in contacting state as a resistance value change and utilizing a temperature coefficient of metal resistance [$r=r0\ (1+\Delta\alpha T)$] to obtain the temperature of the heat generating portion. More specifically, after a resistance r is measured when a current i which is too weak to raise the temperature up to igniting the igniter, a resistance R is measured when a current I of 10 to 15 times of the current i is flowed (the temperature of the heat generating portion becomes about 50 to 100° C., but the priming is not ignited with such a temperature), so that the resistance change due to the temperature change of the heat generating portion is obtained as a voltage change with comparisons of I and i and of R and r. Thus, such measurement information is recorded in the integrated circuit.

(ii) The Function for Identifying Each Plurality of Gas Generators:

For the gas generator for an air bag, various kinds of gas generators such as one for a driver side, one for a passenger side next to the driver, one for a side impact (for a side collision), one for a curtain air bag and the like have been practically used. For example, in the case of the gas generator for a side impact, the total four gas generators are mounted for a driver side, a passenger side next to the driver, two rear seat sides respectively. For this reason, though different information pieces are recorded in the respective integrated circuits of the gas generators for the driver side, for the passenger side next to the driver, and for two rear seat sides, when these information pieces are recorded at a time of assembling the igniters or the gas generators or before assembling, since the igniters or the gas generators have the same appearance, it is necessary to distinguish the gas generators having the same appearance and having different information pieces recorded or the igniters having the same appearance before assembling such that a wrong one is not taken to store and transport them, which becomes much complicated. Furthermore, with one for a driver side mounted to a vehicle erroneously as one for a passenger side next to the driver, when activation information of an air bag for a driver side is sent from the ECU, such an erroneous activation that an air bag for a passenger side next to the driver is inflated occurs eventually.

Therefore, by recording of information for developing identifying function for each plurality of gas generators after assembling of gas generators (when differences of gas generators can be recognized apparently), after gas generators are assembled in module cases (when differences of module cases can be recognized apparently) or after gas generators are mounted to a vehicle, storage, transportation, management and the like of gas generators can be made easy, so that a mistake or a confusion is prevented from occurring at a time of mounting of gas generators.

It is preferable that the information for developing an identifying function for each plurality of gas generators are recorded after assembling the gas generators, it is more preferable that the information pieces are recorded after the gas generators are assembled in the module cases, and it is further preferable that the information pieces are recorded after the module cases are mounted to a vehicle.

(iii) The Function for Detecting a Malfunction of the Capacitor:

The information for developing a function for detecting a malfunction of the capacitor also includes confirmation information of a mounted state (soldered state) of a capacitor to a substrate and the like in addition to information for measuring a pulse response or a dielectric dissipation factor.

After mounted to the vehicle, since the capacitor repeats charging and discharging, the capacitor deteriorates with age. However, abnormality is detected at a time of a practical use (while driving a vehicle) by recording information which can confirm a malfunction due to this deterioration in the integrated circuit in advance, so that a prompt exchange can be performed. Furthermore, by recording information for confirming the soldered state in advance, an inferior product can be removed at a time of shipping.

(iv) A circuit for preventing the igniter from being activated erroneously by a noise made outside the igniter (a noise countermeasure circuit).

For example, when a large current flows at a time of activating a cell motor in a vehicle, in case of not providing a noise preventing circuit, there is a possibility that a noise (a noise causing an uncomfortable unusual sound occurrence while listening to the radio) generated due to this current is transmitted from a vehicle body to flow in an igniter. Due to that the noise is transmitted in this manner, a possibility that an igniter causes an erroneous activation becomes high. Accordingly, by mounting a device constituted to prevent a current from flowing from a vehicle side to an igniter side, for example, a diode or a varistor (a non-linear resistance element) as the noise countermeasure circuit (a circuit for preventing an igniter from being activated erroneously), the above-described erroneous activation of the igniter can be prevented (4) Fourth and Fifth Solving Means The present invention according to claim 30 provides, as another solving means for the above problem, an igniter of an air bag system which is at least two igniters share one capacitor and one integrated circuit inputted with information to exhibit required functions when the air bag system of the above invention has at least two igniters for each of the plural gas generators.

The at least two igniters share one capacitor and one integrated circuit inputted with information for exhibiting required functions, and further, they share a discharging waveform converting circuit which is provided, if required, to convert a signal waveform of a current for igniting the priming stored in the capacitor for each igniter. And thereby, the entire system can further be reduced in weight. In this case, the discharging waveform converting circuit may be assembled into the integrated circuit.

The invention described in claim 31 provides, as another means for solving the problem, an igniter of an air bag system wherein each igniter has a capacitor and an integrated circuit inputted with information to exhibit required functions, and further has two pins for supplying and transmitting a current and required information to at least two igniters from the bus line when the air bag system of the above invention has at least two igniters for each of the plural gas generators.

In the igniter of the air bag system according to the above first to fifth solving means, there is provided with a circuit which, among the currents from the bus circuit for charging the capacitor and the required information, is a circuit, for charging the capacitor, having a function for rectifying a current to flow into a capacitor to be charged (hereinafter, referred to as "a rectifying circuit), and further, it is preferable that a function for amplifying at least one of a rectified voltage for charging a capacitor and a voltage applied to the bus line exists in the rectifying circuit.

(5) Sixth Solving Means

The invention provides, as another means for solving the above problem, a method for controlling operation of an air bag system using the above igniter for an air bag system, wherein a time period for supplying a current from the capacitor to the heat generating portion is the time period from the point where a current value reaches the current value corresponding to 5% of the maximum current value to the point where it is reduced down to the value corresponding to 5% of the maximum current value, which is within 500 μsec. In this case, the maximum current value in the period for supplying a current is a current value sufficient to ignite the priming.

In the case of a conventional air bag system, since a current for activating an igniter flows from a power source (a battery) with a relatively large capacitance at 1.2 A for about 2 msec, that is, at a relatively low current for a relatively long time, a waveform of an ignition current (a vertical axis denotes a current value (A) and a horizontal axis denotes a time (μ sec)) becomes rectangular.

In the present invention, however, since a current for activating an igniter is supplied from a capacitor with a relatively small capacitance, it is preferable that a relatively high electric current flows for a short time, because ignition of the igniter is made smoother and ignition energy itself can be made smaller. The waveform of the ignition current at this time (a vertical axis denotes a current value (A) and a horizontal axis denotes a time (μsec)) becomes a discharging waveform expressed by the following formula (I) when discharging starts at a time of time t=0:

$$i(t)=(V0/R)\times e^{-t/CR} \qquad (I)$$

(In the formula, v0 represents a capacitor charging voltage (V), R represents a circuit resistance (Ω), C represents a capacitor capacitance (μF), t represents a time (μsec), and i represents a current (A)).

When such a discharging waveform expressed by the formula (I) is employed, a current value becomes larger than a conventional rectangular waveform, but a current conduction time is shortened. Therefore, the ignition energy itself is reduced largely.

In the present invention, when a period in which a stable current supplying is being maintained after reaching a desired current value is defined as t (μsec) and a period from a start of waveform rising to stopping of current supplying for making the heat generating portion generate a heat is defined as T (μsec), it is preferable that a relationship (t/T) between these t and T is in the range of 0≦t/T<0.2 or 0.5<t/T<1.

In the case of 0≦t/T<0.2, a waveform of a current is similar to a discharging waveform (a waveform similar to a triangle) obtained when electricity stored in the capacitor is applied to the heat generating portion directly. In case of 0.5<t/T<1, a waveform of a current is similar to a waveform obtained when a discharging waveform is converted through a discharging waveform converting circuit (hereinafter, abbreviated as "a waveform converting circuit") for converting a waveform of a current stored in a capacitor to a signal waveform of a current for igniting the priming or the like.

The period for supplying a current is as described above, and it is preferably within 200 μsec, and more preferably within 100 μsec. Incidentally, a current value at this time varies depending on a resistance value of the heat generating portion in the igniter, and it is determined on the basis of presence or absence of the waveform converting circuit, the constitution of the waveform converting circuit, a particle diameter of a priming, a shape of the heat generating portion and the like.

(6) Seventh Solving Means

The invention provides, as another means for solving the above problem, a method for controlling operation of an air bag system using the above integrated circuit for an air bag system, wherein a current to the heat generating portion is supplied as an ignition pulse, and the current is supplied such that the width of the ignition pulse becomes 20 to 500 μsec.

In the case of a conventional air bag system, since a current for activating an igniter flows from a power source (a battery) with a capacitance at 1.2 A for about 2 msec, that is, at a relatively low current for a relatively long time, a waveform of an ignition current (a vertical axis denotes a current value (A) and a horizontal axis denotes a time (μsec)) becomes rectangular.

Therefore, in the above invention, a current is supplied at a relatively high electric current for a relatively short time, namely, a current is supplied such that the width of the ignition pulse is 20 to 500 μsec, preferably 30 to 200 μsec, and more preferably 40 to 100 μsec. As a result, since an amount of ignition energy required for activating individual igniters can be reduced, the amount of ignition energy required for all the igniters, namely for the entire air bag system can be reduced. For this reason, the capacitance of the capacitor for backup power source incorporated into the ECU can be made smaller, and accordingly, the ECU itself can be reduced in size.

In the above invention, it is preferable, in view of reduction of the amount of a current, that a current is supplied such that the width of the ignition pulse becomes 40 to 100 μsec.

According to the air bag system employing the present invention, the weight of the entire air bag system can remarkably be reduced by using the bus system and an operation performance similar to the conventional one can be ensured.

EXPLANATION OF NUMERALS 10 and 11 bus line

Preferred Embodiments of the Invention

An air bag system of the present invention achieves reduction in weight of the entire system by using a bus line and achieves reliability of an operation of the system by the above-described solving means. Embodiments including the above-described first to seventh solving means will be explained below. In this case, the order of the solving means and the order of embodiments do not coincide with each other necessarily.

(1) First Embodiment

Figure 1:
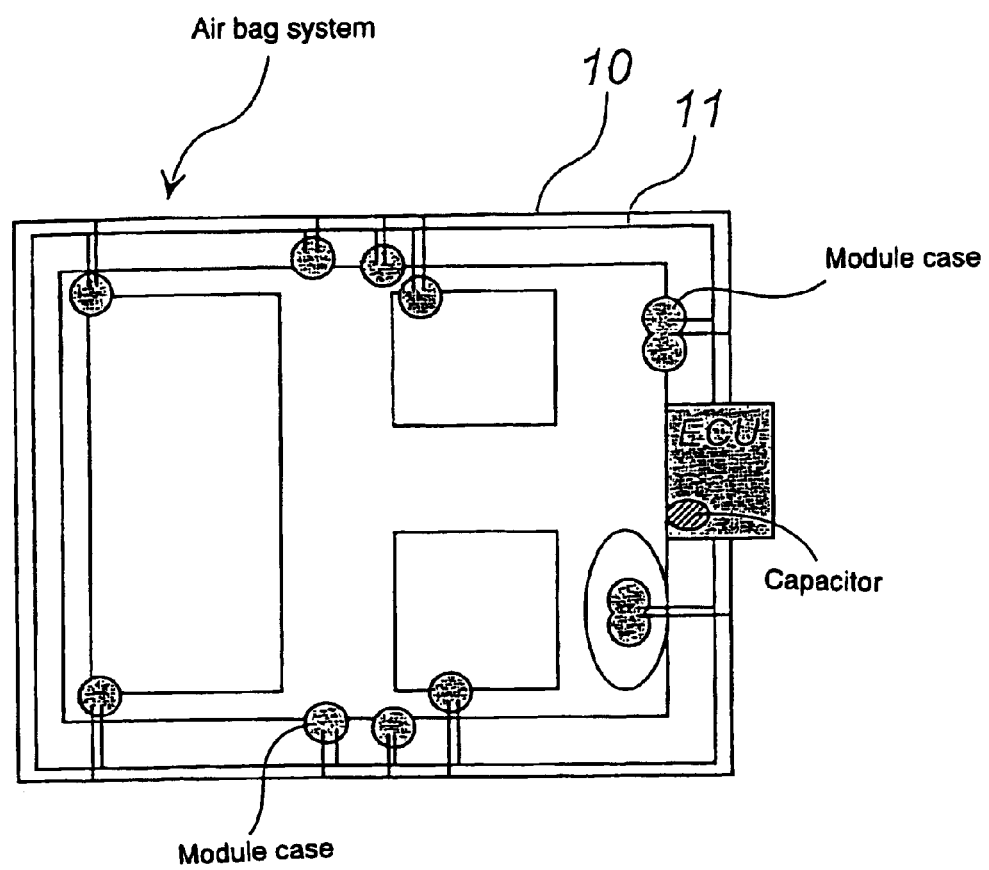
FIG. 1 is a diagram of an air bag system employing an igniter for an air bag system of the present invention.
Figure 13:
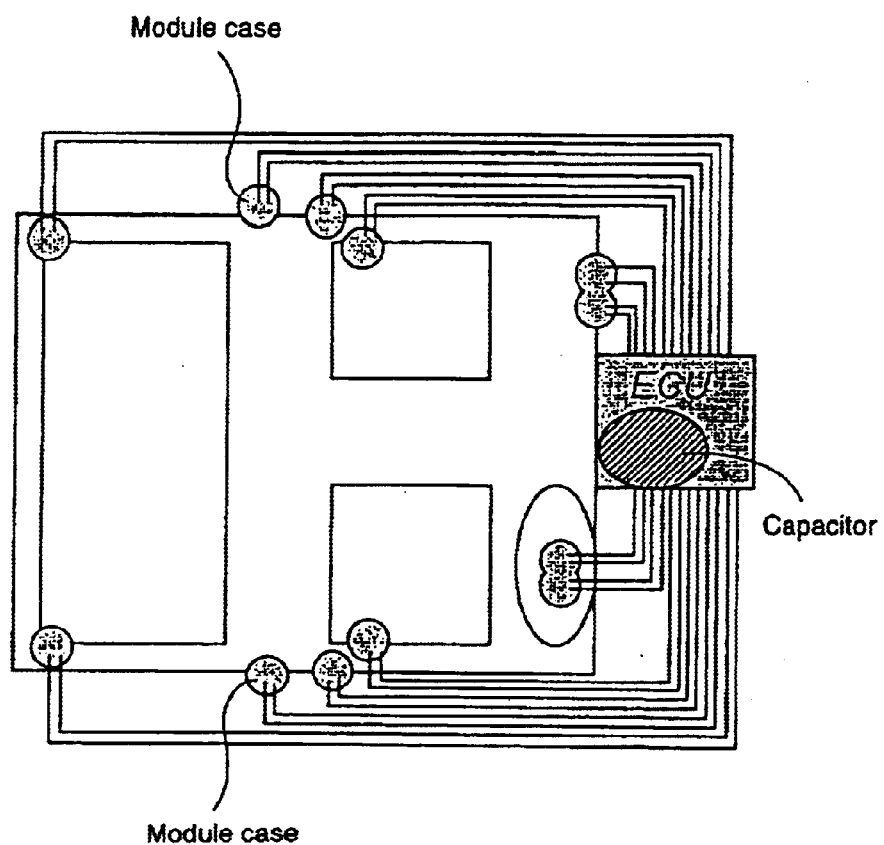
FIG. 13 is a diagram of a conventional air bag system.
Figure 14:
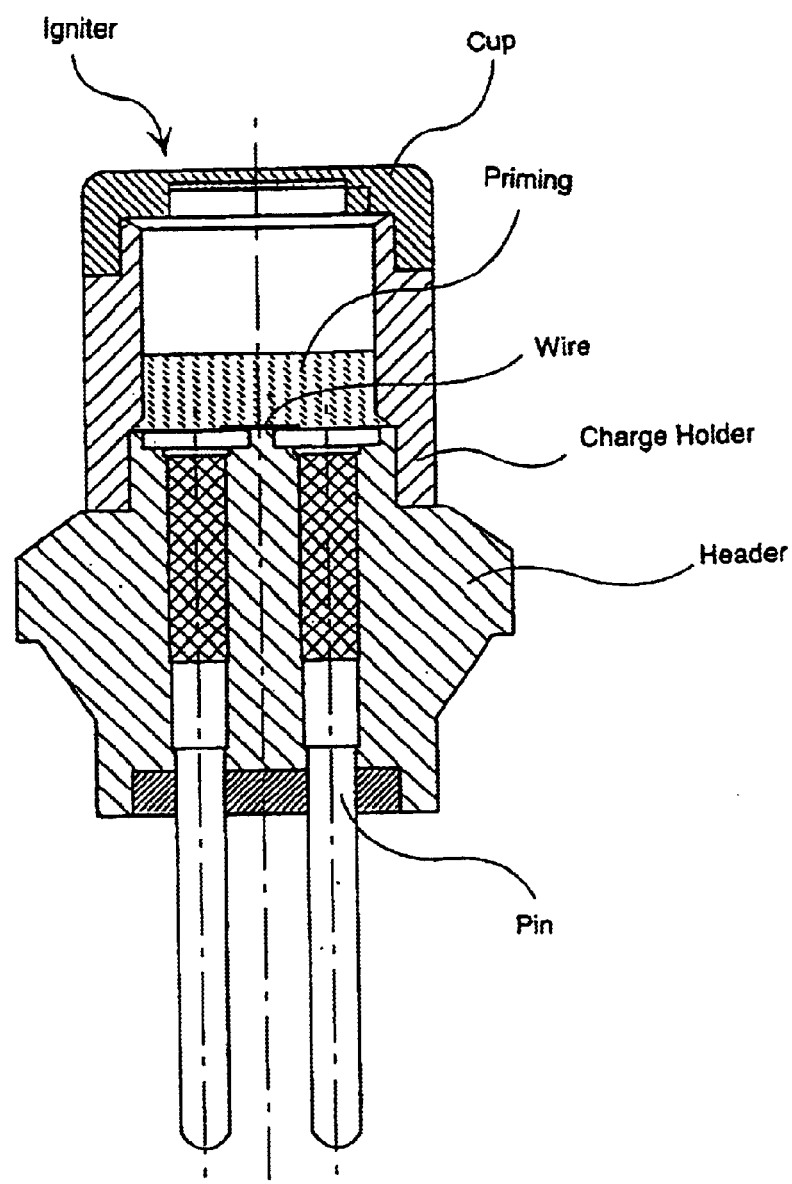
FIG. 14 is a vertical sectional view of an igniter used in the conventional air bag system.

As shown in FIG. 1, an air bag system using an igniter for an air bag system of the present invention uses bus lines 10 and 11 comprising two loop wires passing through an ECU. The ECU is connected to a power source (a battery in a vehicle) and an impact detecting sensor which are not illustrated, and a capacitor for backup, when a conductor connecting the ECU and the power source is disconnected by an impact at a collision of a vehicle, is disposed. Incidentally, in the air bag system of the present invention, since the capacitor is disposed at each of respective gas generators (igniters), the capacitor for backup may be one with a small capacitance (i.e., lightweight), but the capacitor serving for backup in the conventional air bag system shown in FIG. 13 has to have a large capacitance in order to activate all the gas generators by itself at a time of disconnection of a lead wire between the battery and the ECU.

Gas generators in a required number of module cases (which are indicated by black circles. The gas generator and an air bag are accommodated in the case.) mounted to a vehicle are connected to the bus lines 10 and 11 to be actuated by two conductors (or three or more conductors when occasion demands).

Figure 2:
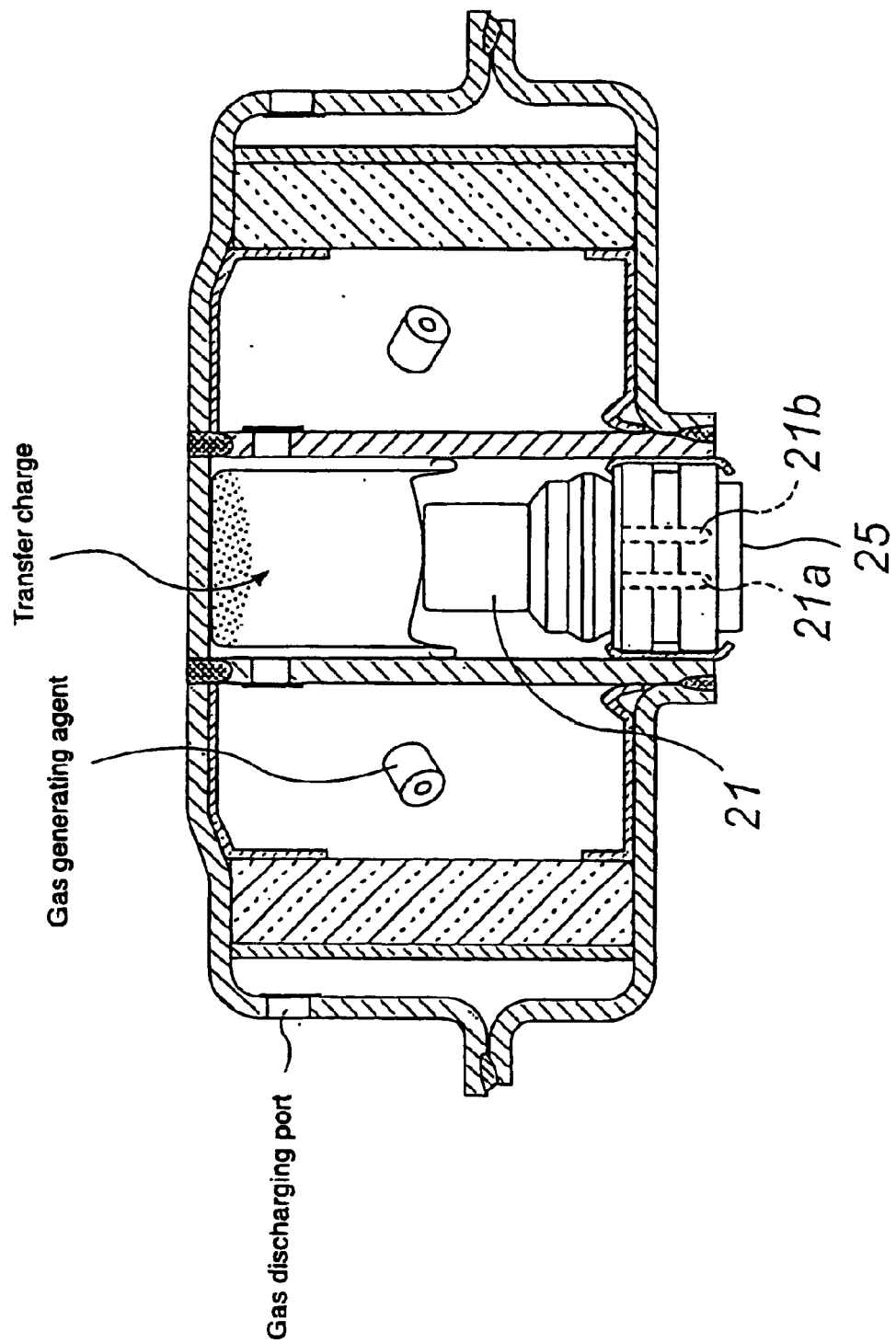
FIG. 2 is an axial sectional view of a gas generator including an igniter (including one igniter) for an air bag system of the present invention.
Figure 3:
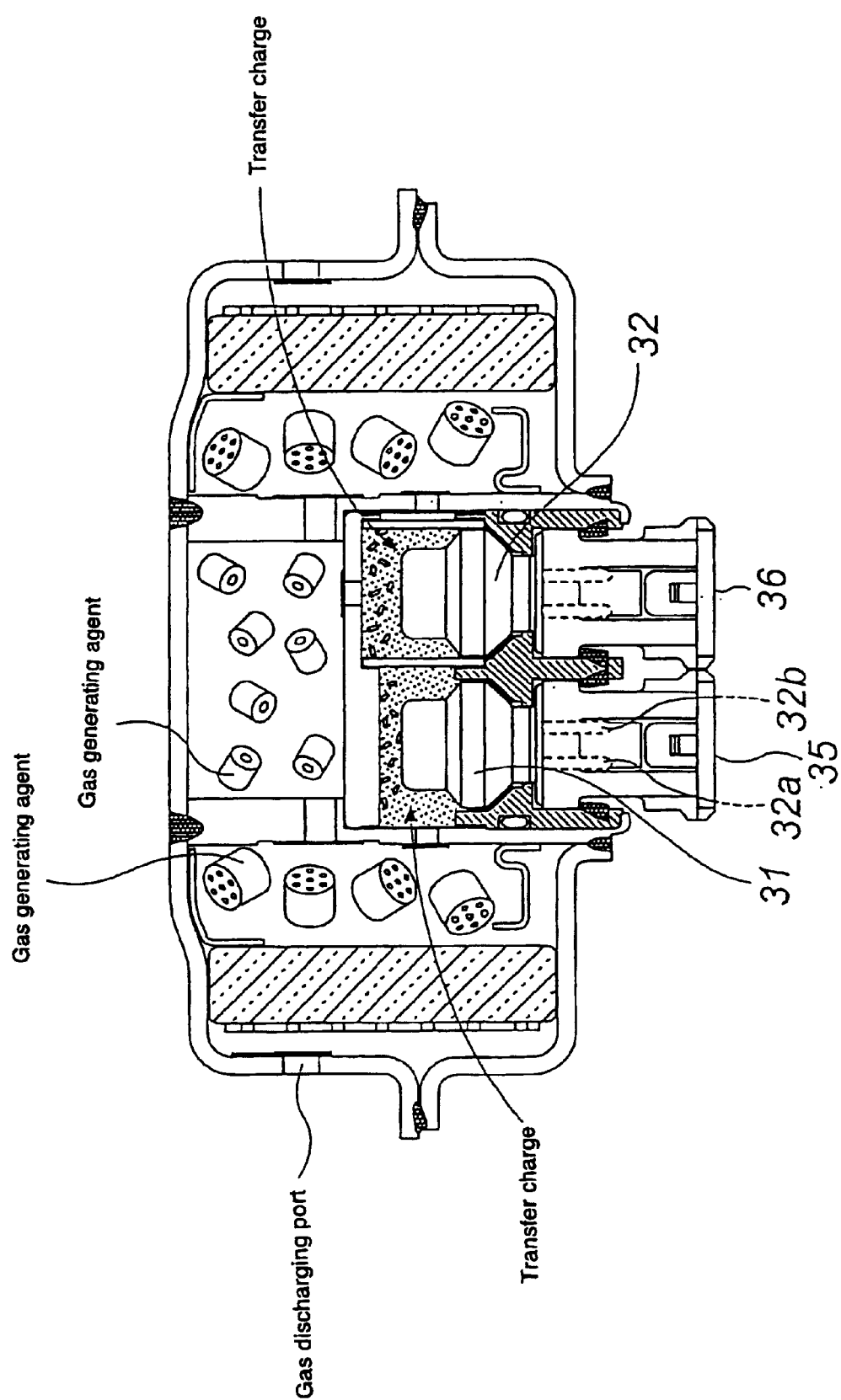
FIG. 3 is an axial sectional view of a gas generator including an igniter (including two igniters) for an air bag system of the present invention.

As the gas generators in the module cases illustrated with black circles in the air bag system shown in FIG. 1, ones shown in FIG. 2 or FIG. 3 can be used according to the number of the igniters. FIG. 2 is an axial sectional view of a single type gas generator (an igniter 21) in which one igniter is provided, and FIG. 3 is an axial sectional view of a dual type gas generator (igniters 31 and 32) in which two igniters are provided.

In the single type gas generator, two (or three or more when occasion demands) pins 21a and 21b are provided in the igniter 21 and they are connected to the bus lines 10 and 11 through a connector 25.

In the dual type gas generator, two (or three or more when occasion demands) pins 31a and 31b are provided in an igniter 31, two (or three or more when occasion demands) pins 32a and 32b are provided in an igniter 32, and the igniters are respectively connected to the bus lines 10 and 11 through respective connectors 35 and 36.

Figure 4:
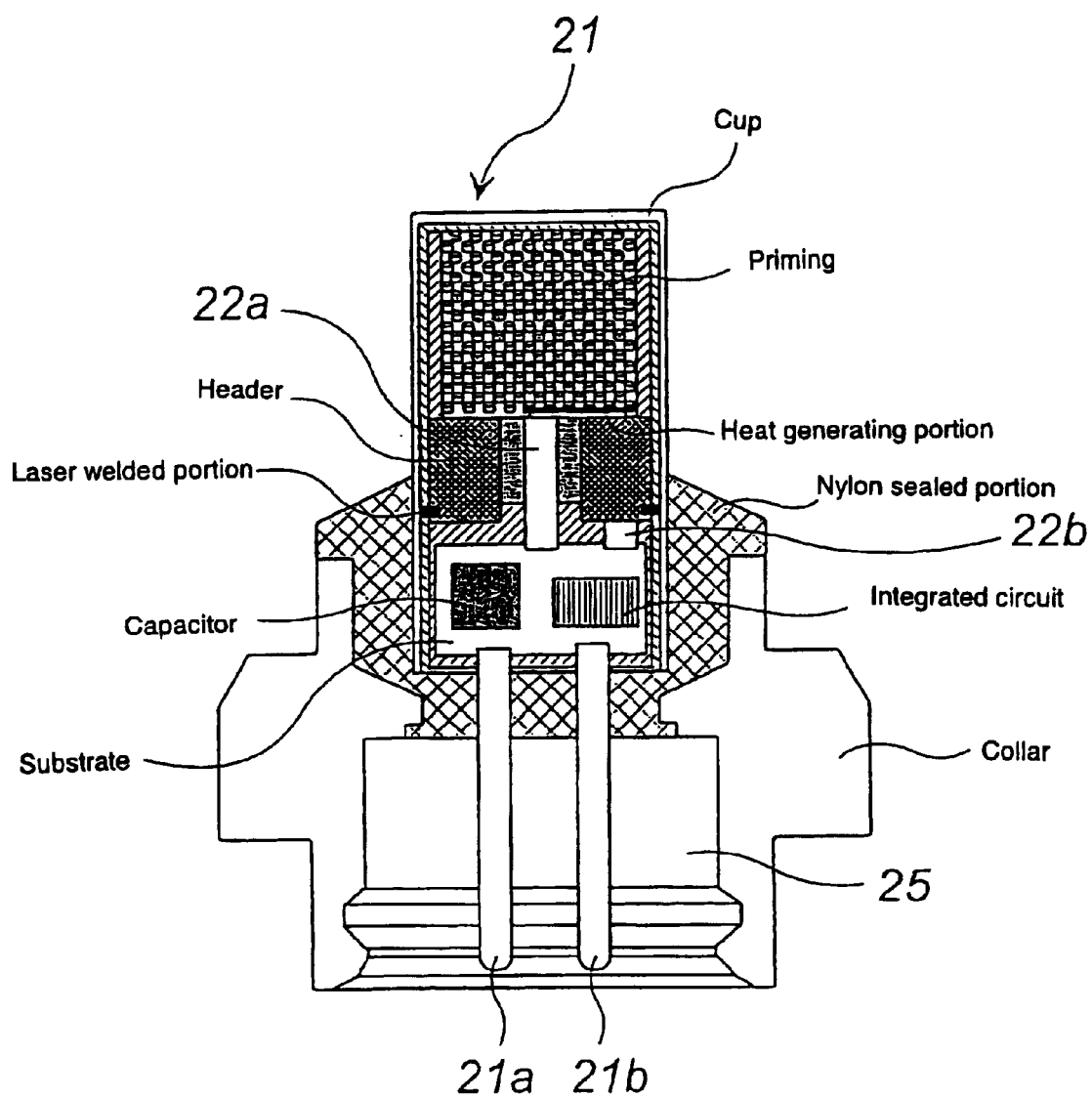
FIG. 4 is a vertical sectional view of an igniter for an air bag system of the present invention.

As the igniter 21 and the igniters 31 and 32 in the gas generators shown in FIG. 2 and FIG. 3, for example, one shown in FIG. 4 can be used. FIG. 4 shows vertical schematic sectional views of igniters, and since igniters having the same structure can be used as the igniter 21, the igniters 31 and 32, the igniter 21 will be explained below.

A heat generating portion is provided on a glass header, a priming (for example, ZPP) is charged to come in pressure-contact with the heat generating portion, and a substrate provided with a capacitor and an integrated circuit in which information for developing required functions has been recorded is disposed in a lower portion of the igniter 21. The integrated circuit, and the heat generating portion and the capacitor are respectively connected by two conductors, and the integrated circuit is further connected to the pins 21a and 21b through conductors.

The integrated circuit is recorded with information to inflate a required air bag when a command is received from the ECU at least at a collision of a vehicle. In addition, information for developing one or at least two functions, when required, for example, selected from the group of a function for detecting abnormality of the heat generating portion of the igniter in the gas generator, a function for identifying each of the plural gas generators and a function for detecting a malfunction of the capacitor can be recorded in the integrated circuit.

Figure 5:
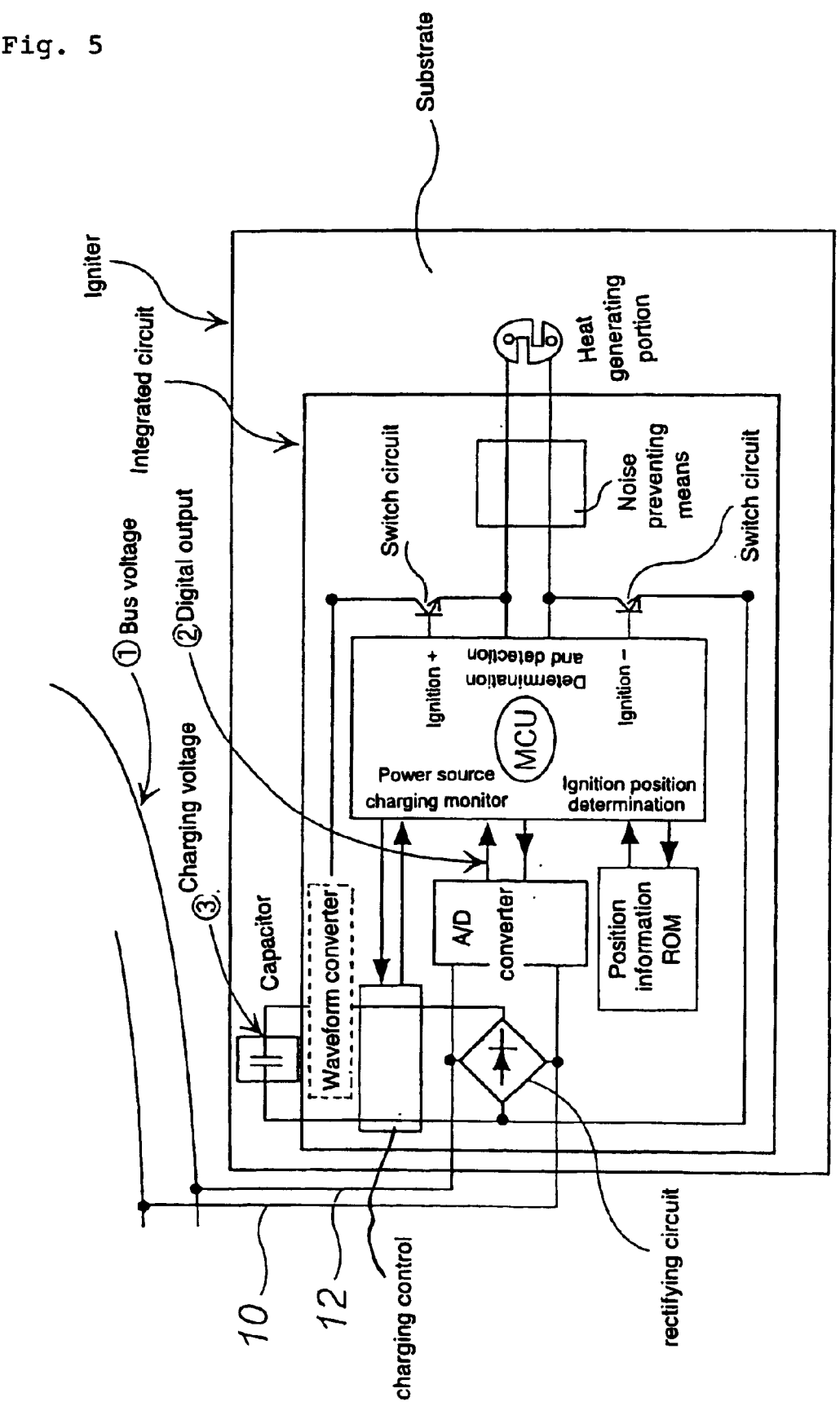
FIG. 5 is a conceptual diagram of an igniter for an air bag system of the present invention.
Figure 6:
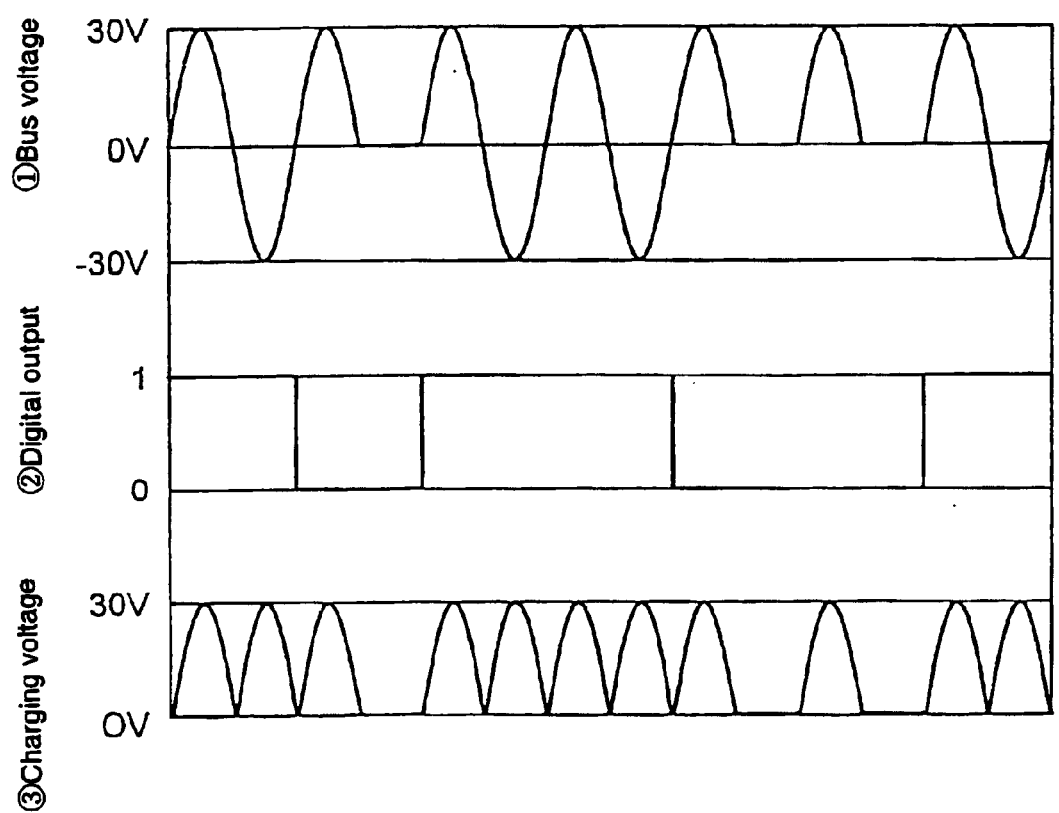
FIG. 6 is a pulse waveform diagram of a bus voltage, a digital output and a charging voltage shown in FIG. 5.

The substrate in the igniter, as shown in FIG. 4, that is provided with the capacitor or the integrated circuit may be constituted to have each of structures shown with the conceptual diagrams in FIG. 5. Incidentally, FIG. 6 shows pulse waveforms of a bus voltage, a digital output and a charging voltage shown in FIG. 5.

The capacitor and the integrated circuit are provided on the substrate, a discharging waveform converting circuit (shown as a "waveform converting circuit" with a broken line) can be provided thereon, if required, and the discharging waveform converting circuit itself can be incorporated into the integrated circuit. The electric current for a capacitor is provided via a rectifying circuit.

The integrated circuit and the capacitor on the substrate are connected to the bus lines 10 and 11 through the pins 21a and 21b. After a current and information supplied from the bus lines 10 and 11 are sent to the integrated circuit, they are converted to digital outputs by an A/D converter (an analog/digital converter) to be sent to an MCU (a Micro Computer Unit). Thereafter, a command is sent from the MCU such that charge control information, position identification information, disconnection-detecting information of a heat generating portion or a resistance value change detecting information is exhibited, and also, the current is used for charging the capacitor, but it is not used for making the heat generating portion generate heat.

A varistor (non-linear resistance element) is disposed in a circuit between the MCU and the heat generating portion as noise preventing means, and it serves such that the igniter is not activated erroneously due to a noise generated outside the igniter.

The heat generating portion is put in contact with the priming, and it generates heat by a current supplied only from the capacitor to ignite the priming.

Next, an operation of the air bag system employing the present invention and a method of controlling operation of the air bag system will be explained with reference to FIG. 1, FIG. 5 and the like.

When a vehicle runs normally, disconnection-detecting information or resistance value change detecting information of the heat generating portion, detecting information for a malfunction of the capacitor, and detecting information about whether or not an igniter including an identifying function required for activating a gas generator (detecting information about whether or not an igniter having an identification function for activating a gas generator required for a driver side, a passenger side next to the driver or the like properly at a time of collision is disposed rightly, or whether or not another igniter having the same identifying function is disposed in a duplicated manner) is sent from the ECU to the gas generator (the integrated circuit arranged in the igniter) through the bus lines so that whether or not there is abnormality in these members is checked. When there is an abnormality, an alarm lamp activated in linkage with the air bag system, or the like informs the abnormality, so that an early exchange of parts can be conducted to recover the safety. Further, the capacitor of each igniter can be charged from the power source.

When a vehicle provided with the air bag system collides, information from the impact detecting sensor is sent to the ECU, and information from ECU is sent, via the bus lines 10 and 11, to a gas generator (the integrated circuit provided in the igniter) required to inflate an air bag for ensuring a safety for a vehicle occupant.

Upon receiving this information, a required current is supplied from the capacitor for a predetermined time period (from the point where a current value reaches the current value corresponding to 5% of the maximum current value to the point where it is reduced to 5% of the maximum current value which is only within 500 $\mu$sec), and the heat generating portion generates heat to ignite and burn the priming. At this time, the waveform of the current forms a discharging waveform represented by the formula (I) when a discharging starts at a time t=0. By igniting and burning the priming, a transfer charge in FIG. 2 or FIG. 3 and further the gas generating agent are ignited and burnt to generate a gas. The gas is discharged from gas discharging ports to inflate an air bag accommodated in the module case together with the gas generator.

(2) Second Embodiment

An igniter for an air bag system of this embodiment is characterized in a structure of a substrate on which the integrated circuit and the like is arranged, a state of the disposition or the like.

First, a structure of a substrate will be explained. As shown in FIG. 5, a capacitor, an integrated circuit recorded with information to exhibit required functions and a heat generating portion are provided on the substrate, and these members can be arranged on one surface or both surfaces of the substrate.

Figure 7:
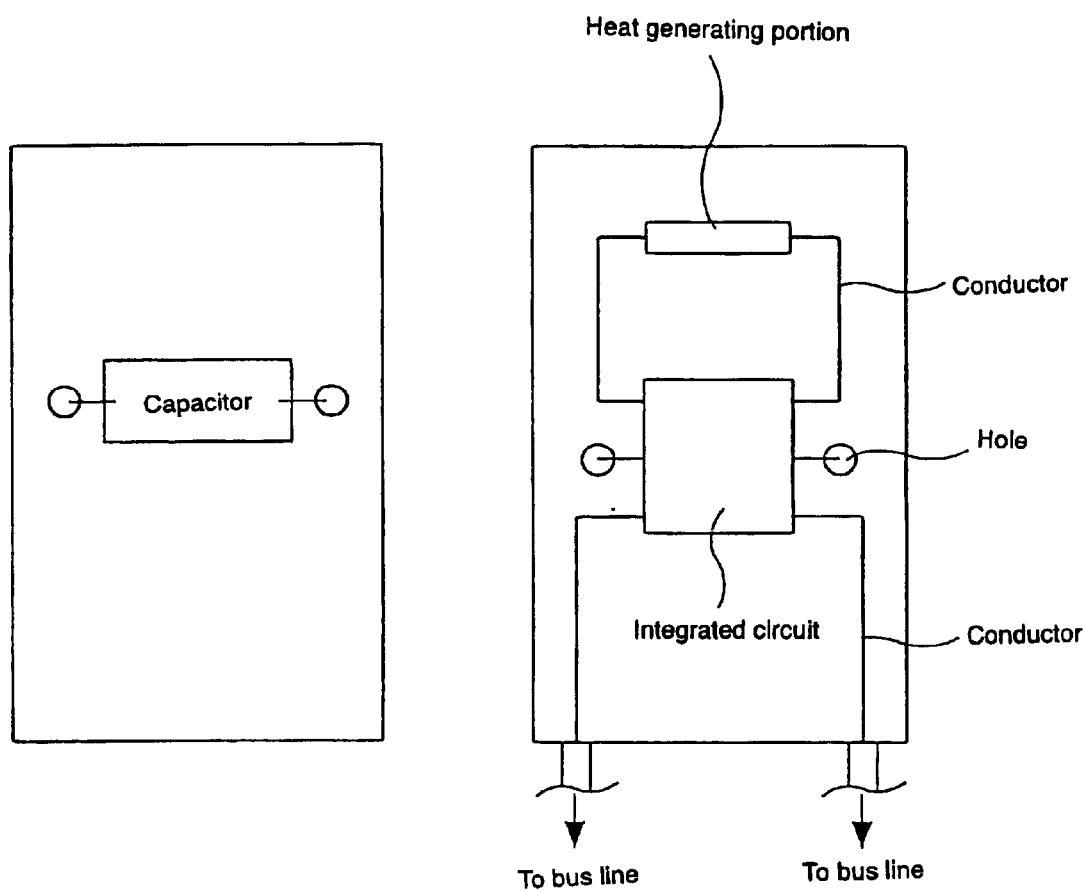
FIG. 7 is a plan view of both surfaces of a substrate (respective elements are arranged on both surfaces) provided in an igniter for an air bag system of the present invention.

As shown in FIG. 7, such a structure can be employed that the integrated circuit and the heat generating portion are provided on one surface of the substrate, and the capacitor is provided on the other surface. When this structure is employed, the capacitor and the integrated circuit are connected through two conductors inserted into two holes, and the integrated circuit and the heat generating portion are connected through two conductors. The integrated circuit is also connected to the bus lines 10 and 11 through two conductors, pins of the igniters or the like.

Figure 8:
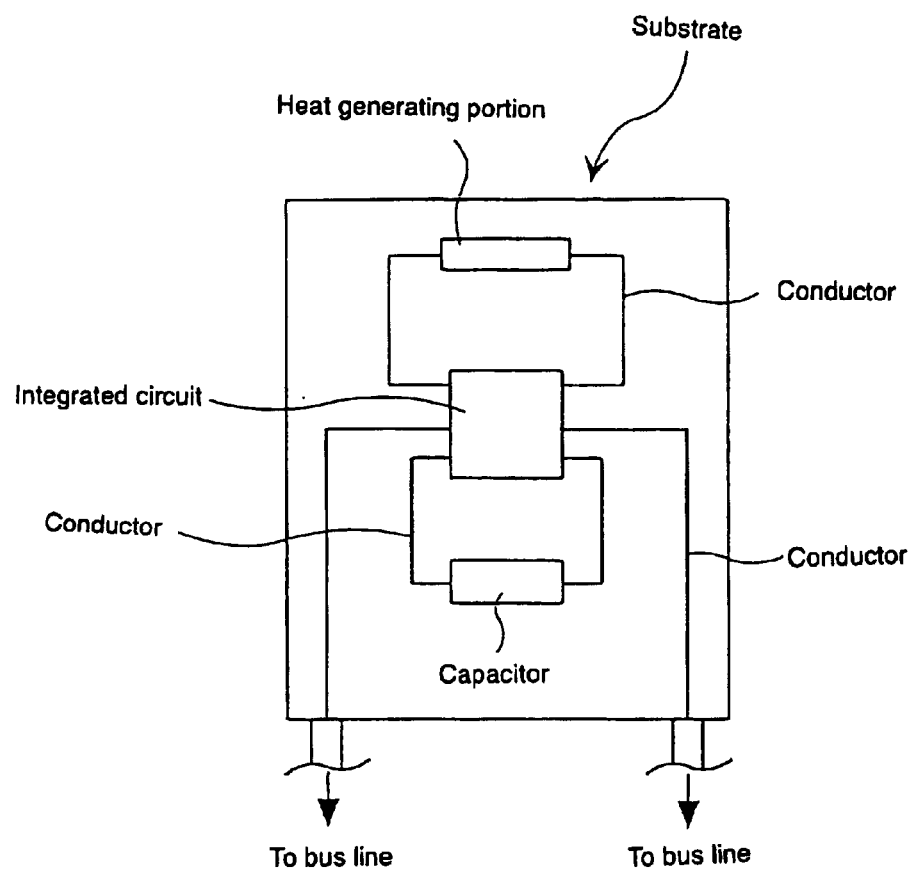
FIG. 8 is a front view of a substrate (respective elements are arranged on one surface) provided in an igniter for an air bag system of the present invention.

As shown in FIG. 8, such a structure can be employed that the integrated circuit, the heat generating portion and the capacitor are arranged on one surface of the substrate. The integrated circuit, the capacitor and the heat generating portion are connected by two conductors respectively, and the integrated circuit is also connected to the bus lines 10 and 11 through two conductors, pins of the igniters or the like.

Figure 9:
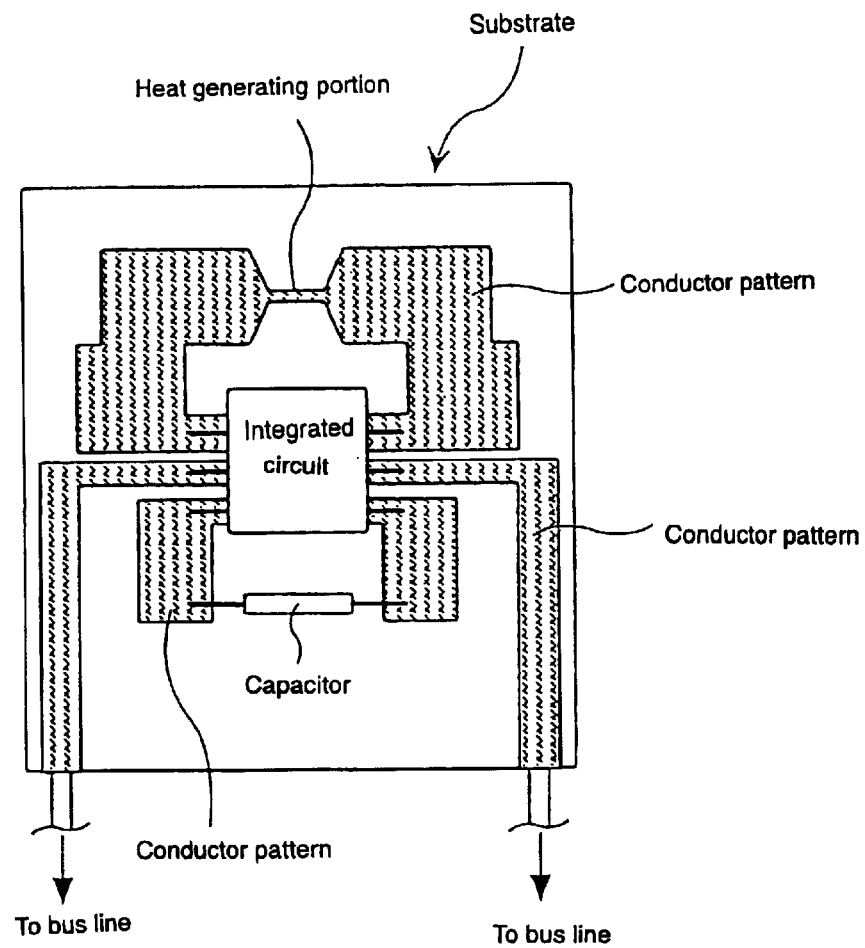
FIG. 9 is a front view of another embodiment of a substrate (respective elements are arranged on one surface) provided in an igniter for an air bag system of the present invention.

An electroconductive pattern is formed on the substrate by etching as shown in FIG. 9, including connecting portions which connect the integrated circuit with the heat generating portion, the capacitor and the bus line, and the heat generating portion, shown in FIG. 7 and FIG. 8. By using a conductor pattern by such etching, connecting respective elements is performed more easily.

Figure 10:
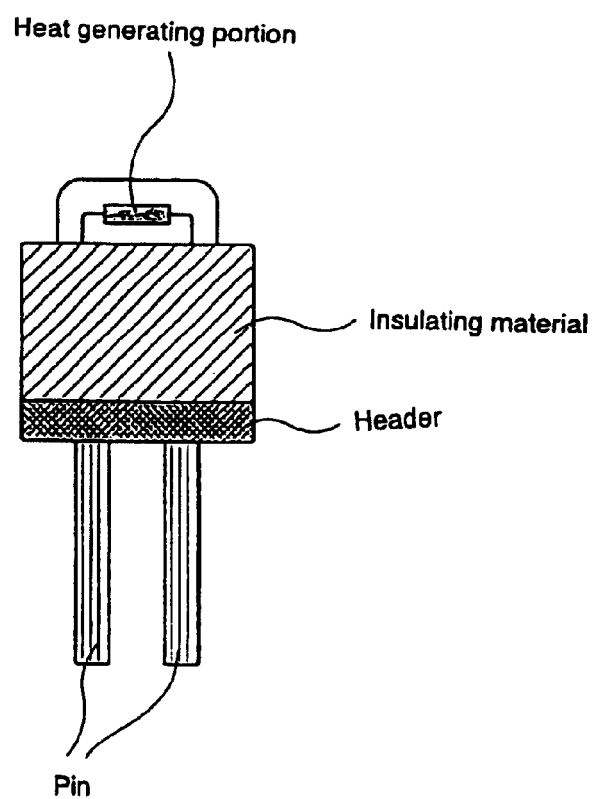
FIG. 10 is a front view of a substrate provided in an igniter for an air bag system of the present invention and sealed with insulating material.

As shown in FIG. 10, when a portion of the substrate except for the heat generating portion is covered and sealed with insulating material such as epoxy resin, the sealing resin serves as a protection film for the integrated circuit or the capacitor, which is preferable. In FIG. 10, the substrate shown in FIG. 7 is used, but the substrate shown in FIG. 9 can be also used. The substrate is provided to stand on the glass header.

Next, the disposing state of the substrate will be explained with reference to FIG. 11. The substrate used in FIG. 11 is shown in FIG. 10, but, in the drawing, the priming covering the heat generating portion is deleted and the seating portion of the insulating material is partially cut out.

Figure 11:
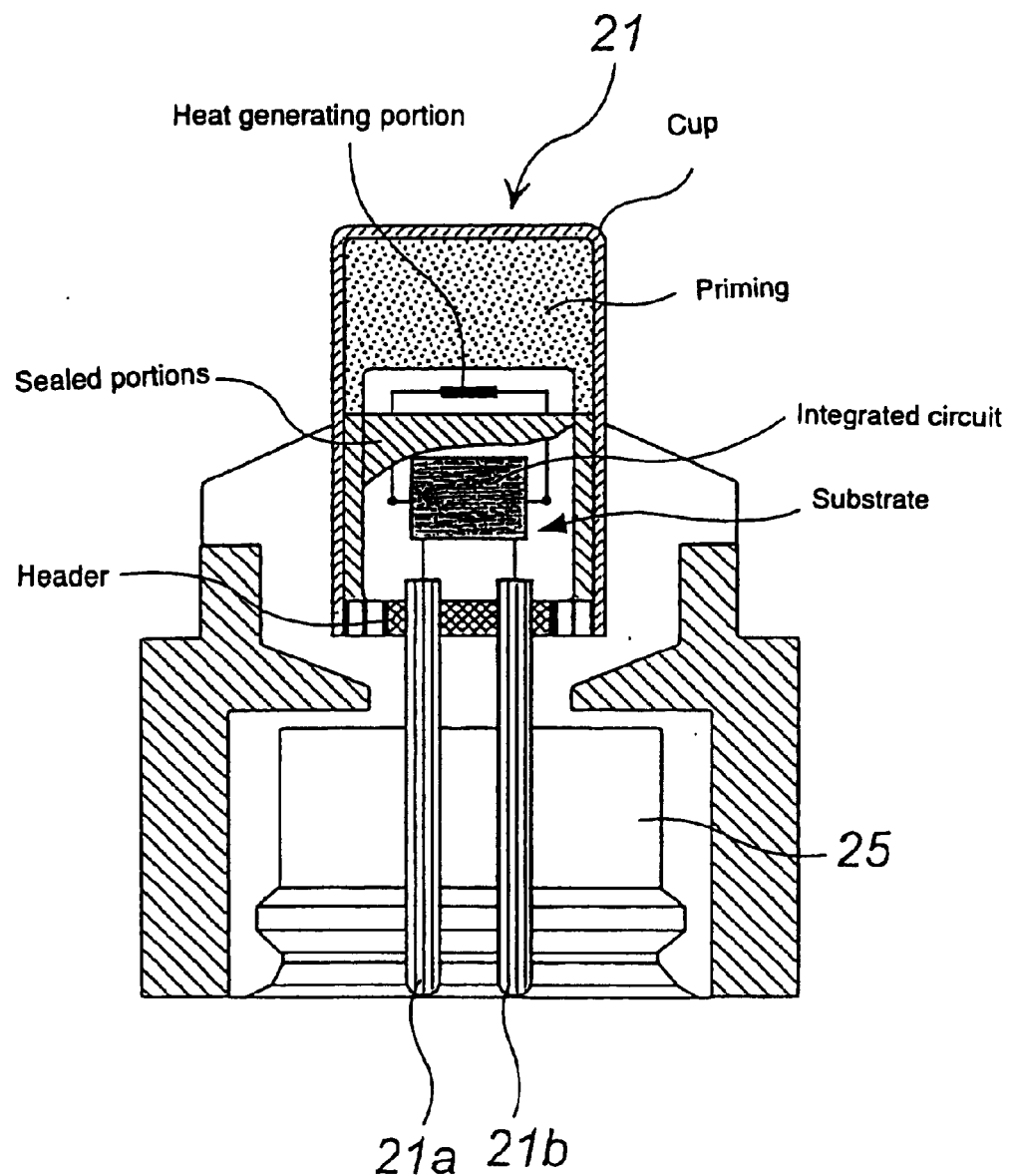
FIG. 11 is a vertical sectional view of another embodiment of an igniter for an air bag system of the present invention.

As shown in FIG. 11, since the substrate shown in FIG. 10 is used as the substrate in the igniter 21 (having a different shape from the shape shown in FIG. 4), the substrate is provided to stand on the header, a portion of the substrate except for the heat generating portion is covered with insulating material such as epoxy resin, and the heat generating portion comes in contact with the priming. Contacting surfaces of a substrate bottom surface and the header are fixed by adhesive.

By providing the substrate on the header vertically in this manner, a space capacity for disposing the substrate can be made smaller than a case of laying the substrate, so that the igniter itself can be reduced in size. Then, since the integrated circuit and the capacitor on the portion of the substrate except for the heat generating portion do not come in contact with the priming, pollution thereof or the like are prevented.

Further, in the igniter 21 shown in FIG. 4, a glass header for supporting pins 21a and 21b sections vertically between the substrate and the priming, and a substrate arranged with the capacitor and the integrated circuit is provided below the header vertically. Then, the heat generating portion is disposed above the header (on a surface of the header), and the heat generating portion and the substrate are connected by conductors (two pins 22a and 22b). The heat generating portion is formed by employing a method for welding a wire for heat generation on the header to fix the heat generating portion, or the like.

In the embodiment shown in FIG. 4, also, the integrated circuit, the capacitor, and the pins 21a and 21b can be connected by a conductor pattern obtained by etching, and the heat generating portion and the integrated circuit can be connected by a conductor pattern obtained by etching.

As described above, by providing the substrate below the header vertically, a space capacity for disposing the substrate can be made smaller than a case of laying the substrate, so that the igniter itself can be reduce in size. And, since the substrate and the priming do not come in contact with each other, pollution of the integrated circuit or the capacitor or the like can be prevented.

The air bag system of the second embodiment operates like the air bag system of the first embodiment.

(3) Third to Fifth Embodiments

As shown in FIG. 5, a capacitor, an integrated circuit recorded with information to exhibit a function for detecting abnormality of a heat generating portion in an igniter, and a heat generating portion of an igniter are disposed on a substrate. The information includes disconnection of the heat generating portion, a loose contact between the heat generating portion and the priming and the like.

Since abnormality such as disconnection, a loose contact between the heat generating portion and the priming or the like can be detected rapidly by recording the above information in the integrated circuit, early exchange of parts can be performed to improve reliability of the system and safety of a vehicle occupant.

As shown in FIG. 5, the capacitor, the integrated circuit recorded with information to exhibit an function for identifying each of the plural gas generators, and the heat generating portion of the igniter are disposed on the substrate. Preferably, the information to exhibit the above-described identifying function is recorded after the gas generator is assembled, after the gas generator is disposed into the module case, or after the module case is mounted in a vehicle.

By recording the above information of the identifying function in the integrated circuit in this manner, not only such management as storage, transportation or the like of a product is facilitated but also an erroneous activation such that an air bag is inflated differently from a command from the ECU is prevented in a practical use, so that reliability of the system and safety of a vehicle occupant can be improved.

As shown in FIG. 5, the capacitor, the integrated circuit recorded with information to exhibit a function for detecting a malfunction of the capacitor and the heat generating portion of the igniter are provided on the substrate. The information includes information for measuring a pulse response or dielectric dissipation factor.

By recording the above information in the integrated circuit, a malfunction of the capacitor can rapidly be detected, so that prompt exchange of parts can be performed to improve reliability of the system and safety of a vehicle occupant.

In the above-described third to fifth embodiments, a current required for exhibiting each recorded information is supplied from the power source (a battery in a vehicle) to the integrated circuit via the bus lines 10 and 11 and the two pins 21a and 21b of the igniter 21, and a command for exhibiting the recorded information from the ECU is also transmitted to the integrated circuit via the same path as the current. Then, the air bag systems of the third to fifth embodiments operate like the air bag system of the first embodiment.

(4) Sixth Embodiment

Figure 12:
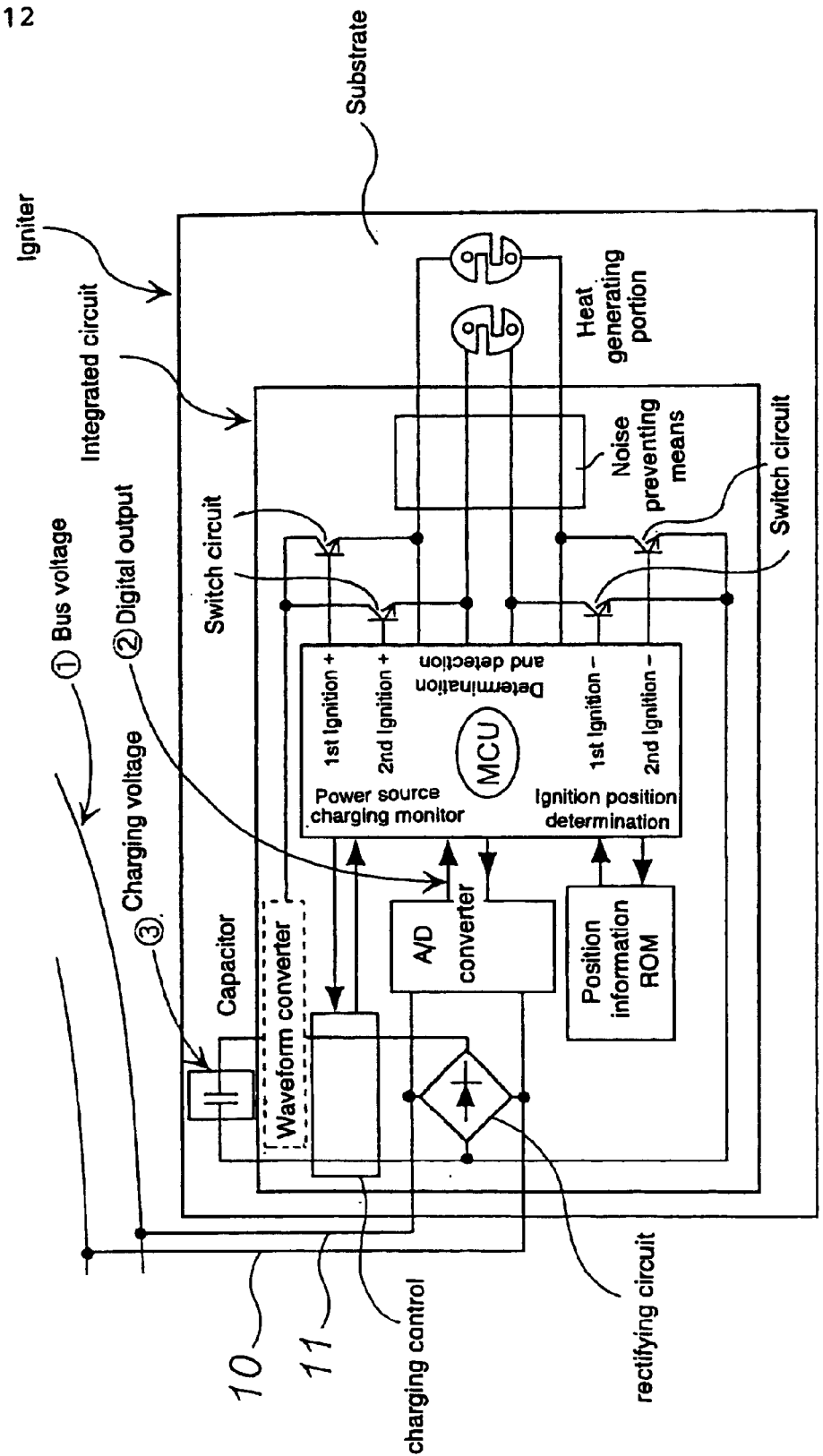
FIG. 12 is a vertical sectional view of another embodiment of an igniter for an air bag system of the present invention.

In FIG. 12, in a gas generator having two igniters, two heat generating portions share one capacitor, an integrated circuit in which information for developing required functions has been recorded, and a discharging waveform converting circuit provided if required.

When the gas generator has two igniters 31, 32, as shown in FIG. 3, three operation aspects such that a case of activating only either one of the igniters, a case of first activating one of the igniters and then activating the other with a slight delay, and a case of simultaneously activating the two igniters are considered according to a collision state of a vehicle, and, the integrated circuit of the igniter shown in FIG. 12 is recorded with such information to make two heat generating portions generate heat according to each of the above-described three instruction from the ECU.

The igniters 31 and 32 of the gas generator shown in FIG. 3 can be made to have the structures shown in FIG. 5 or in FIG. 12.

The air bag system of the sixth embodiment also operates like the air bag system of the first embodiment, and it operates in response to the above-described three command contents.

(5) Seventh Embodiment

A method for controlling operation of an air bag system in which an integrated circuit for an air bag system of the present invention is incorporated will be explained with reference to FIG. 1 to FIG. 5, and FIG. 12.

When a vehicle runs normally, a weak current for disconnection detection in the heat generating portions is fed from the MCU to the igniters of the gas generators, and abnormality in the portions is detected, if any. Then, when abnormality is detected, an alarm lamp or the like actuated in linkage with the air bag system informs the occupant of the abnormality. Therefore, early exchange of parts can be conducted so that safety can be ensured. Further. a current component is caused to flow from the bus line along with the required information for charging the capacitor.

When the vehicle provided with the air bag system has collided, information from the impact detecting sensor is sent to the ECU, and the integrated circuit further receives the information sent from the ECU to develop the required functions.

As shown in FIG. 5 (or FIG. 12), a switch circuit (a transistor) for shutting off current when it is unnecessary to actuate the igniter and for starting current supply at a time of actuation of the igniter is provided in the integrated circuit. When the switch circuit is being opened, a current stored in the capacitor does not flow into the heat generating portion.

By feeding a control pulse instructing opening or closing of the switch circuit from the MCU, the switch circuit is opened or closed. The instruction of the control pulse transmission to the pulse generator is sent from the MCU upon receiving a command from the impact detecting sensor.

If the switch circuit is applied with, for example, a current pulse with a waveform width of 100 μsec from the MCU, the switch is closed for 100 μsec and it allows a current from the capacitor to flow in the heat generating portion of the igniter as a pulse with a width of 100 μsec. That is, the switch circuit closes a switch while a current (a control pulse) is flowing in the switch circuit like a case of using a thyristor, a MOS-FET, or a bipolar transistor as the switch circuit. In this manner, by applying a pulse with a predetermined time width (20 to 500 μsec) to the heat generating portion of the igniter, the heat generating portion is caused to generate heat with a required igniting energy to ignite and burn the priming.

The transfer charge in the gas generator shown in FIG. 2 or FIG. 3, and further the gas generating agent are ignited and burnt by ignition and combustion of the priming to generate a gas, and the generated gas is discharged from the gas discharging port to inflate the air bag accommodated in the module case together with the gas generator.

By using such an integrated circuit for an air bag system, an amount of the current (ignition energy amount) required for actuating individual igniters normally is reduced, so that an amount of a current (ignition energy amount) required for actuating all the igniters normally is also reduced. As a result, the capacitance (namely, weight) of the capacitor for backup power source can also be reduced, and the ECU itself can be made smaller. For this reason, the weight of the entire air bag system can be reduced.

The igniter for an air bag system of the present invention can be applied as an igniter for various inflators (gas generators) such as an inflator for an air bag for a driver side, an inflator for an air bag for a passenger side next to the driver, an inflator for a side air bag, an inflator for a curtain air bag, an inflator for a knee-bolster air bag, an inflator for an inflatable seat belt, an inflator for a tubular system, and an inflator for a pretensioner.

What is claimed is:

1. An igniter for an air bag system, one or more igniters incorporated in a plurality of gas generators for an air bag system, comprising:

an electronic control unit connected to a power source and an impact detecting sensor;

a plurality of module cases connected to the electronic control unit and accommodating a plurality of gas generators and a plurality of air bags, wherein, in the air bag system, a bus line having a plurality of loop wires which pass through the electronic control unit is provided to supply and transmit currents and required information, and individual gas generators accommodated in the plurality of module cases are connected operationally by a plurality of conductors branched at predetermined portions from the bus line, each of the one or more igniters incorporated in the gas generator is an electric igniter provided with a heat generating portion and a priming coming in contact with the heat generating portion, and the igniter and the bus line are connected to each other through the plurality of conductors, and the capacitor and the integrated circuit recorded with information to exhibit required functions are provided in the igniter, and a current for igniting the priming is supplied to the one or more igniters through a capacitor inside the igniter.

2. The igniter for an air bag system according to claim 1, wherein the bus line includes two loop wires.

3. The igniter for an air bag system according to claim 1 or 2, wherein the waveform of a current supplied from the capacitor is a discharging waveform expressed by the following formula (I) when discharging starts at a time of time t=0:

$$i(t)=(V0/R) \times e-t/CR \qquad (I),$$

where, v0 represents a capacitor charging voltage (V), R represents a circuit resistance (Ω), C represents a capacitor capacitance (μF), t represents a time (μsec), and i represents a current (A)).

4. The igniter for an air bag system according to claim 1 or 2, wherein, each igniter includes a capacitor, the integrated circuit having required functions, and a discharging waveform converting circuit.

5. The igniter for an air bag system according to claim 4, wherein the discharging waveform converting circuit for converting a signal waveform of a current for igniting the priming stored in the capacitor in each igniter is provided in the integrated circuit.

6. An igniter for an air bag system having one or more igniters incorporated in a plurality of gas generators for an air bag system, comprising:

an electronic control unit connected to a power source and an impact detecting sensor; and a plurality of module cases connected to the electronic control unit and accommodating a plurality of gas generators and a plurality of air bags, wherein, in the air bag system, a bus line having a plurality of loop wires which pass through the electronic control unit is provided to supply and transmit currents and required information, and individual gas generators accommodated in the plurality of module cases are connected operationally by a plurality of conductors branched at predetermined portions from the bus line, each of the one or more igniters incorporated in the gas generator is an electric igniter provided with a heat generating portion and a priming coming in contact with the heat generating portion, and the igniter and the bus line are connected to each other through the plurality of conductors, a capacitor, an integrated circuit in which information for developing a required function is stored, and the heat generating portion is provided on one substrate in each igniter, and the substrate is provided vertically, and at least the capacitor and the integrated circuit, and the priming on the substrate are not in contact with one another, and a current for igniting a priming is supplied to the igniter through the capacitor in the igniter.

7. An igniter for an air bag system having, one or more igniters incorporated in a plurality of gas generators for an air bag system, comprising:

an electronic control unit connected to a power source and an impact detecting sensor; and a plurality of module cases connected to the electronic control unit and accommodating a plurality of gas generators and a plurality of air bags, wherein, in the air bag system, a bus line including a plurality of loop wires which pass through the electronic control unit is provided to supply and transmit currents and required information, and individual gas generators accommodated in the plurality of module cases are connected operationally by a plurality of conductors branched at predetermined portions from the bus line, each of the one or more igniters incorporated in the gas generator is an electric igniter provided with a heat generating portion and a priming coming in contact with the heat generating portion, and the igniter and the bus line are connected to each other through the plurality of conductors, each igniter has a capacitor and an integrated circuit in which information to exhibit a required function which are provided on the one substrate, and the substrate is provided vertically, a header, which supports an electroconductive member for supplying and transmitting a current between the substrate and the heat generating portion, sections vertically between the substrate and the priming, and the substrate is arranged below the header and the heat generating portion is arranged above the header, and a current for igniting the priming is supplied to the one or more igniters through the capacitor in the igniter.

8. The igniter for an air bag system according to claim 6 or 7, wherein, in each igniter, a capacitor, the integrated circuit having required functions and additionally, a discharging waveform converting circuit are provided on one substrate.

9. The igniter for an air bag system according to claim 8, wherein the discharging waveform converting circuit to convert a signal waveform of a current for igniting the priming stored in the capacitor in each igniter exists in the integrated circuit.

10. The igniter for an air bag system according to claim 6 or 7, wherein the integrated circuit is provided on one surface of the substrate and the capacitor is provided on the other surface.

11. The igniter for an air bag system according to claim 6 or 7, wherein the integrated circuit and the capacitor are provided on one surface of the substrate.

12. The igniter for an air bag system according to claim 6, wherein the heat generating portion and the integrated circuit are provided on the same surface of the substrate.

13. The igniter for an air bag system according to claim 6 or 7, wherein the heat generating portion comprises a conductor pattern formed by etching or a heat generating body mounted by soldering.

14. The igniter for an air bag system according to claim 6 or 7, wherein connecting portions which connect the integrated circuit with and the capacitor and the bus line comprise conductor patterns formed on the substrate by etching.

15. The igniter for an air bag system according to claim 6 or 7, wherein a connecting portion between the integrated portion and the heat generating portion, and the heat generating portion further comprises conductor patterns formed on the substrate by etching.

16. The igniter for an air bag system according to claim 15, wherein the conductor patterns which form the connecting portions connecting the integrated circuit with the heat generating portion, the capacitor and the bus line have two routes respectively.

17. The igniter for an air bag system according to claim 14, wherein the conductor patterns which form the connecting portions connecting the integrated circuit with the capacitor and the bus line have two routes respectively.

18. The igniter for an air bag system according to claim 6 or 7, wherein the substrate is fitted to penetrate a header for forming a priming holding space together with a cup member for holding the priming, and the capacitor and the integrated circuit are positioned below the header, and the heat generating portion projects above the header to come into contact with the priming.

19. The igniter for an air bag system according to claim 6 or 7, wherein a portion of the substrate except for the heat generating portion is sealed with insulating material and the heat generating portion comes in contact with the priming.

20. The igniter for an air bag system according to claim 19, wherein the substrate exists above a header for supporting pins serving as interposition members which supply and transmit a current and required information to the integrated circuit and the capacitor.

21. The igniter for an air bag system according to any one of claim 1, 6, or 7, wherein a function for detecting abnormality of the heat generating portion of the igniter in the gas generator is recorded in the integrated circuit provided for each igniter.

22. The igniter for an air bag system according to claim 21, wherein the abnormality of the igniter to be detected includes disconnection, a loose contact between the heat generating portion and the priming, or abnormality of a resistance value of the heat generating portion.

23. The igniter for an air bag system according to claim 21, wherein the a loose contact between the heat generating portion of the igniter and the priming is to be detected by detecting a change in the resistance value due to a temperature change of the heat generating portion as a voltage change.

24. The igniter for an air bag system according to any one of claim 1, 6, or 7, wherein a function for identifying each of the plurality of gas generators is recorded in the integrated circuit provided for each igniter.

25. The igniter for an air bag system according to claim 24, wherein the information to exhibit an function for identifying each of the plurality of gas generators is recorded after assembling the gas generator.

26. The igniter for an air bag system according to claim 24, wherein the information to exhibit an function for identifying each of the plurality of gas generators is recorded after assembling the gas generator in the module case or after mounting into a vehicle.

27. The igniter for an air bag system according to any one of claim 1, 6, or 7, wherein a function for detecting a malfunction of the capacitor is recorded in the integrated circuit provided for each igniter.

28. The igniter for an air bag system according to claim 27, wherein the information to exhibit a function for detecting a malfunction of the capacitor is information for measuring a pulse response or a dielectric dissipation factor.

29. The igniter for an air bag system according to any one of claim 1, 6, or 7, wherein a circuit for preventing the igniter from being activated erroneously by a noise made outside the igniter is provided inside the igniter.

30. An igniter of an air bag system, wherein, in the igniter for an air bag system according to any one of claim 1, 6, or 7, at least two igniters are provided in each of the plurality of gas generators, and at least two igniters share one capacitor, one integrated circuit recorded with information for exhibiting required functions, and a discharging waveform converting circuit which is provided, if required, to convert a signal waveform of a current for igniting the priming stored in the capacitor for each igniter.

31. An igniter of an air bag system, wherein, in the igniter for an air bag system according to any one of claim 1, 6, or 7, at least two igniters are provided each of the plurality of gas generators, and each igniter has a capacitor and an integrated circuit recorded with information to exhibit required functions, and further has two pins for supplying and transmitting a current and required information to at least two igniters from the bus line.

32. The igniter for an air bag system according to any one of claim 1, 6, or 7, wherein a circuit which, among the currents from the bus circuit for charging the capacitor and the required information, is a circuit for charging the capacitor, having a function for rectifying a current to flow into a capacitor to be charged, is provided in the integrated circuit.

33. The igniter for an air bag system according to claim 32, wherein a function for amplifying at least one of a rectified voltage for charging a capacitor and a voltage applied to the bus line exists in the rectifying circuit.

* * * * *